US008153325B2

(12) United States Patent
Oda et al.

(10) Patent No.: US 8,153,325 B2
(45) Date of Patent: Apr. 10, 2012

(54) FUEL CELL

(75) Inventors: Masaru Oda, Utsunomiya (JP); Hiroto Chiba, Utsunomiya (JP); Masahiro Mohri, Utsunomiya (JP); Chikara Iwasawa, Saitama (JP); Narutoshi Sugita, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 697 days.

(21) Appl. No.: 12/315,821

(22) Filed: Dec. 5, 2008

(65) Prior Publication Data

US 2009/0148738 A1 Jun. 11, 2009

(30) Foreign Application Priority Data

Dec. 5, 2007 (JP) ................................. 2007-314804

(51) Int. Cl.
*H01M 8/04* (2006.01)

(52) U.S. Cl. .......................... 429/457; 429/458; 429/514

(58) Field of Classification Search .................. 429/457, 429/458, 514
See application file for complete search history.

(56) References Cited

U.S. PATENT DOCUMENTS

| 2006/0110651 A1 | 5/2006 | Wakahoi et al. |
| 2007/0003816 A1 | 1/2007 | Sugita et al. |
| 2007/0207372 A1 | 9/2007 | Kikuchi et al. |

FOREIGN PATENT DOCUMENTS

| JP | 10-189011 | 7/1998 |
| JP | 2004-273361 | 9/2004 |
| JP | 2006-155947 | 6/2006 |
| JP | 2007-5076 A1 | 1/2007 |
| JP | 2007-207571 | 8/2007 |
| JP | 2007-234438 | 9/2007 |

OTHER PUBLICATIONS

Japanese Office Action for Application No. 2007-314804, dated Apr. 13, 2010.

*Primary Examiner* — Lyle Alexander

(74) *Attorney, Agent, or Firm* — Nelson Mullins Riley & Scarborough LLP; Anthony A. Laurentano

(57) ABSTRACT

A first separator has an outlet side first connection channel connecting a first fuel gas flow field and a fuel gas discharge passage, and a second separator includes an outlet side second connection channel connecting a second fuel gas flow field and the fuel gas discharge passage. The outlet side first connection channel and the outlet side second connection channel include outer passages and outer passages arranged in the same plane formed by facing the first separator and the second separator. The outer passages and the outer passages are formed alternately and independently in the same plane.

5 Claims, 11 Drawing Sheets

FUEL CELL

BACKGROUND OF THE INVENTION

1. Field of the Invention

The present invention relates to a fuel cell formed by stacking a plurality of power generation units. Each of the power generation units comprises first and second electrolyte electrode assemblies, and is formed by stacking the first electrolyte electrode assembly on a first separator, a second separator on the first electrolyte electrode assembly, the second electrolyte electrode assembly on the second separator, and a third separator on the second electrolyte electrode assembly. Each of the first and second electrolyte electrode assemblies includes a pair of electrodes and an electrolyte interposed between the electrodes. A reactant gas passage for at least a fuel gas or an oxygen-containing gas as one of reactant gases extends through the power generation units, and a coolant flow field for a coolant is formed between the power generation units.

2. Description of the Related Art

For example, a solid polymer electrolyte fuel cell employs an electrolyte membrane. The electrolyte membrane is a polymer ion exchange membrane, and interposed between an anode and a cathode to form a membrane electrode assembly (MEA). The membrane electrode assembly and the separators make up a unit cell for generating electricity. In use, typically, a predetermined number of unit cells are stacked together to form a fuel cell stack.

In the fuel cell, a fuel gas flow field for supplying a fuel gas is formed on a separator surface facing the anode, and an oxygen-containing gas flow field for supplying an oxygen-containing gas is formed on a separator surface facing the cathode. Further, a coolant flow field is formed between the separators for supplying a coolant along the surfaces of the separators.

In order to reduce the length of the fuel cell stack in the stacking direction and reduce the weight of the fuel cell stack, so far, attempts to reduce the number of the coolant flow fields have been made by adopting so called skip cooling structure where the coolant flow field is provided for every predetermined number of unit cells.

For example, as shown in FIG. 11, Japanese Laid-Open Patent Publication No. 10-189011 discloses a fuel cell formed by stacking a plurality of cell units 3, and each of the cell units 3 is formed by stacking a first separator 1a, a first MEA (membrane electrode assembly) 2a, a second separator 1b, a second MEA 2b, and a third separator 1c.

Each of the first and second MEAs 2a, 2b includes an ion exchange membrane 4a, and an anode 4b and a cathode 4c fixed on both surfaces of the ion exchange membrane 4a. A fuel channel forming member 5a is provided on a surface of the first separator 1a facing the anode 4b of the first MEA 2a, and a fuel supply channel 5b is formed in the fuel channel forming member 5a. A coolant water channel forming member 6a is provided on the other surface of the first separator 1a, and a coolant water supply channel 6b is formed in the coolant water channel forming member 6a.

An oxygen channel forming member 7a is provided on a surface of the second separator 1b facing the cathode 4c of the first MEA 2a, and an oxygen supply channel 7b is formed in the oxygen channel forming member 7a. A fuel channel forming member 8a is provided on a surface of the second separator 1b facing the anode 4b of the second MEA 2b, and a fuel supply channel 8b is formed in this fuel channel forming member 8a.

An oxygen channel forming member 9a is provided on a surface of the third separator 1c facing the cathode 4c of the second MEA 2b, and an oxygen supply channel 9b is formed in the oxygen channel forming member 9a.

Though not shown, in the fuel cell, supply passages and discharge passages extend through the first separator 1a to the third separator 1c for supplying and discharging the fuel, the oxygen, and the coolant water.

For example, the fuel is supplied to inlets of the fuel supply channels 5b, 8b through the respective supply passages, and the fuel is discharged into the discharge passages from outlets of the fuel supply channels 5b, 8b. Likewise, the oxygen is supplied from the common passages to the oxygen supply channels 7b, 9b, and the oxygen is discharged into the discharge passages from the outlets of the oxygen supply channels 7b, 9b.

In this case, for example, the fuel inlets and the fuel outlets are provided individually corresponding to the fuel supply channels 5b, 8b. For simplification of the flow field structure, it is desirable that the fuel supply channels 5b, 8b have common flow field portion.

However, for example, in the fuel outlet, if the outlet side of the fuel supply channel 5b is closed by the water produced in the power generation, the exhaust gas from the fuel supply channel 8b flows preferentially in the common flow field near the discharge passage. Therefore, the produced water cannot be discharged from the fuel supply channel 5b, and the performance may be degraded due to the insufficient stoichiometric ratio.

SUMMARY OF THE INVENTION

The present invention has been made to solve the above problem, and an object of the present invention is to provide a fuel cell having skip cooling structure in which the flow field structure is simplified, the water is discharged from the fuel cell smoothly, the gases are distributed smoothly, and the desired power generation performance of the fuel cell is maintained as a whole.

The present invention relates to a fuel cell formed by stacking a plurality of power generation units. Each of the power generation units comprises first and second electrolyte electrode assemblies, and is formed by stacking the first electrolyte electrode assembly on a first separator, a second separator on the first electrolyte electrode assembly, the second electrolyte electrode assembly on the second separator, and a third separator on the second electrolyte electrode assembly. Each of the first and second electrolyte electrode assemblies includes a pair of electrodes and an electrolyte interposed between the electrodes. A reactant gas passage for at least a fuel gas or an oxygen-containing gas as one of reactant gases extends through the power generation units, and a coolant flow field for a coolant is formed between the power generation units.

A first reactant gas flow field for supplying the one of the reactant gases to one of electrode surfaces of the first electrolyte electrode assembly, and a first connection channel connecting the reactant gas passage and the first reactant gas flow field are formed on the first separator.

A second reactant gas flow field for supplying the one of the reactant gases to one of electrode surfaces of the second electrolyte electrode assembly, and a second connection channel for connecting the reactant gas passage and the second reactant gas flow field are formed on the second separator.

At least portions of the first connection channel and the second connection channel which are arranged in the same plane formed by mutually facing the first and second separators are formed independently from each other, at different positions in the same plane.

In the present invention, the first connection channel connecting the reactant gas passage and the first reactant gas flow field and the second connection channel connecting the reactant gas passage and the second reactant gas flow field include portions placed in the same plane formed by mutually facing the first and second separators. Therefore, the flow field structure is simplified effectively.

Further, at least the portions of the first connection channel and the second connection channel placed in the same plane are formed independently from each other. Thus, the first connection channel and the second connection channel are not affected by the flows of the reactant gases and the water produced in the power generation. Accordingly, for example, the produced water and the exhaust gas are discharged smoothly and reliably into the reactant gas discharge passages. Degradation of the power generation performance due to the insufficient stoichiometric ratio is prevented suitably.

In the first connection channel and the second connection channel, flow distribution or merging from the reactant gas supply passage does not occur, and the pressure loss is suppressed. In this manner, it becomes possible to smoothly and reliably supply the reactant gas from the fuel gas supply passage to the first reactant gas flow field and the second reactant gas flow field.

The above and other objects, features and advantages of the present invention will become more apparent from the following description when taken in conjunction with the accompanying drawings in which a preferred embodiment of the present invention are shown by way of illustrative example.

DESCRIPTION OF THE PREFERRED EMBODIMENTS

Figure 1:
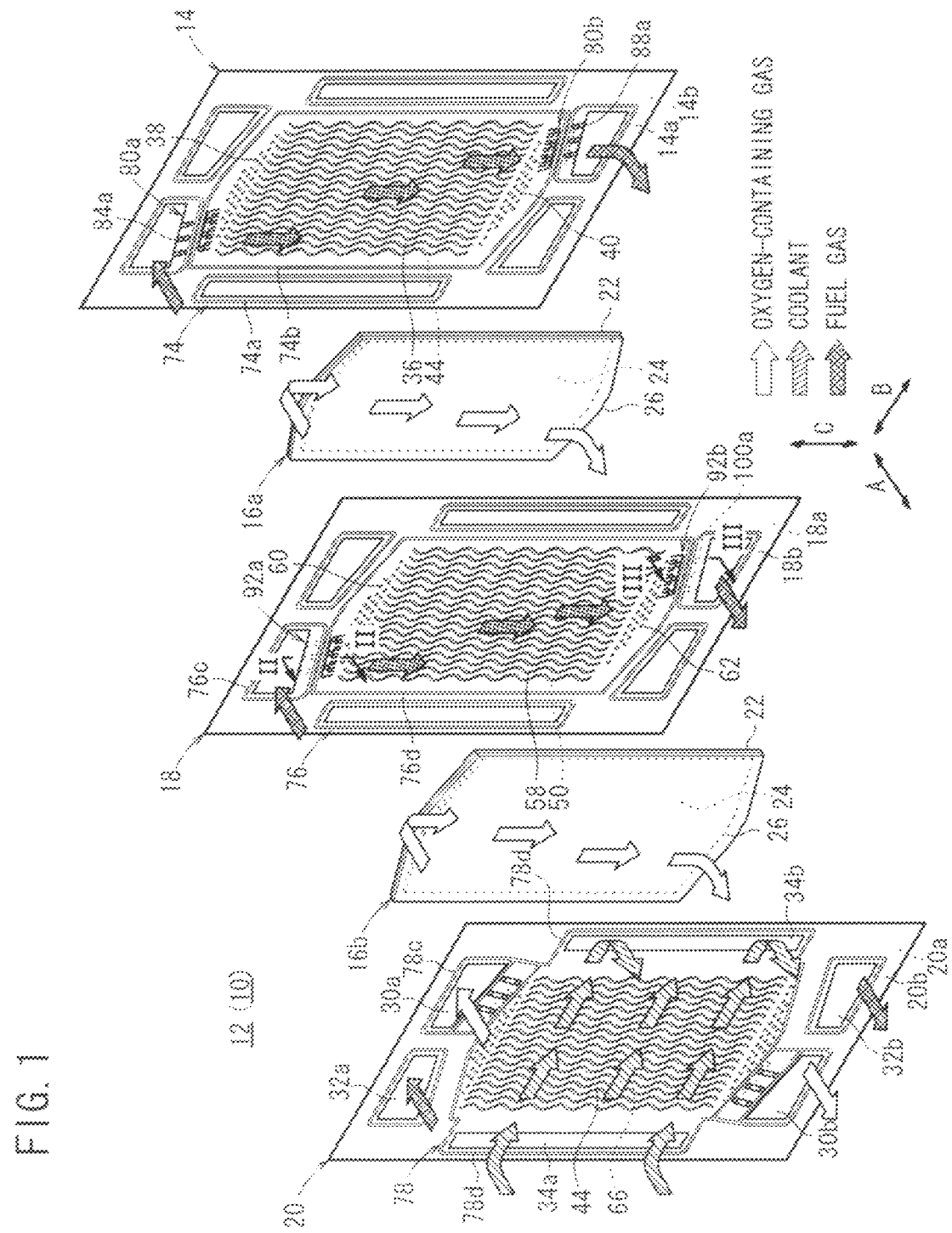
FIG. 1 is an exploded perspective view showing main components of a fuel cell according to an embodiment of the present invention.
Figure 2:
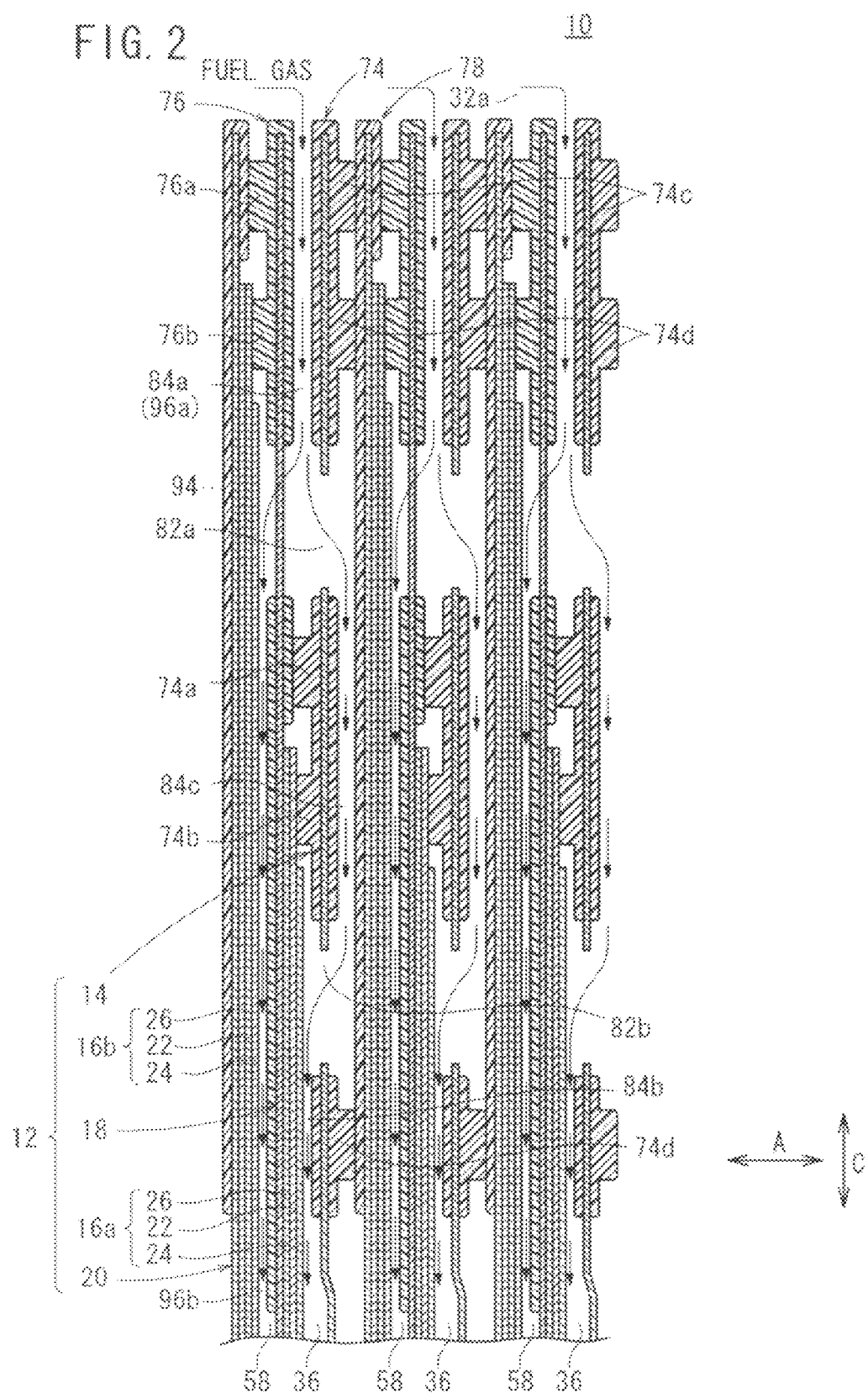
FIG. 2 is a cross sectional view showing the fuel cell taken along a line II-II in FIG. 1.
Figure 3:
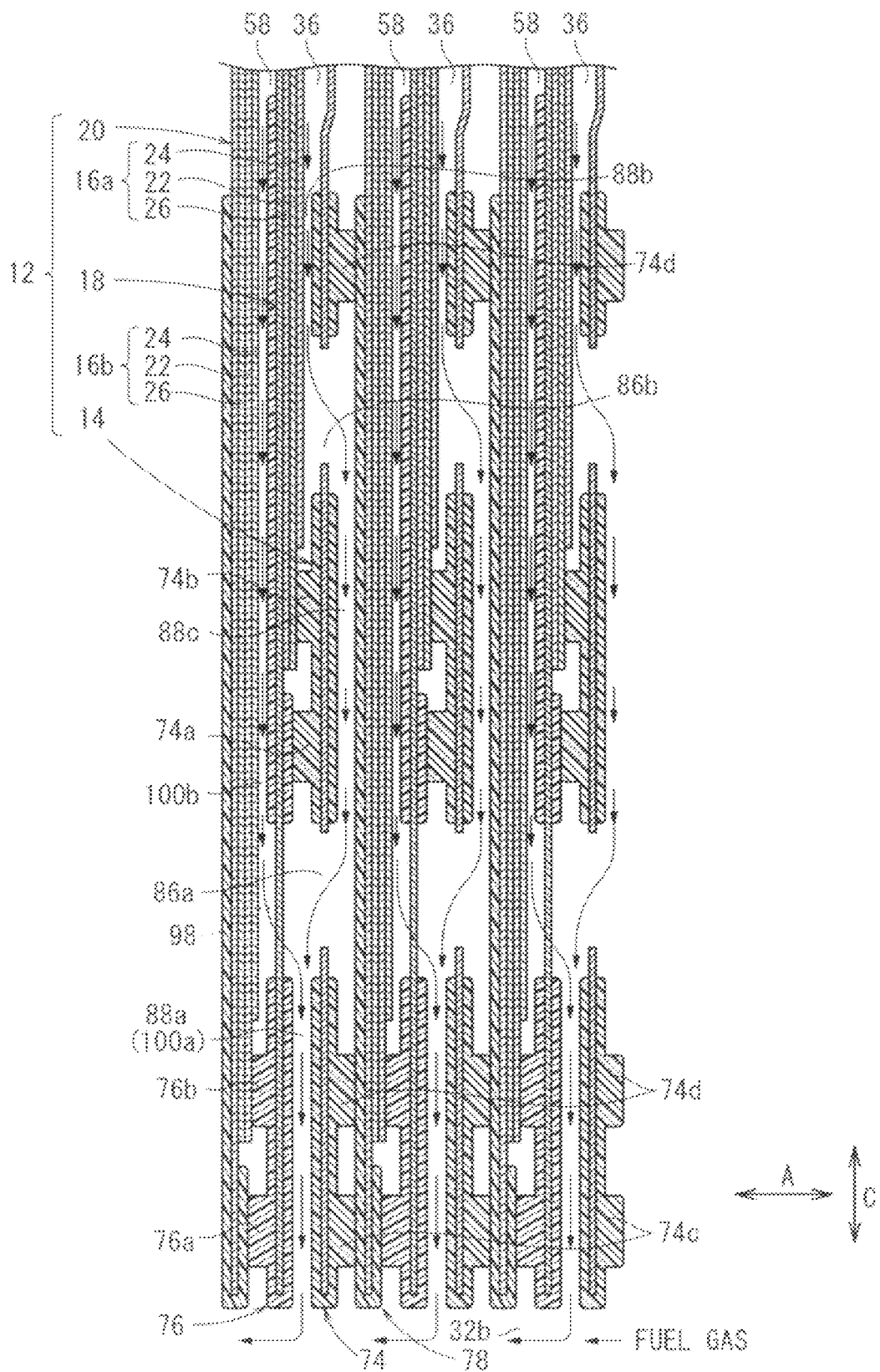
FIG. 3 is a cross sectional view showing the fuel cell taken along a line III-III in FIG. 1.

FIG. 1 is an exploded perspective view showing main components of a fuel cell 10 according to an embodiment of the present invention. FIG. 2 is a cross sectional view showing the fuel cell 10 taken along a line II-II in FIG. 1. FIG. 3 is a cross sectional view showing the fuel cell 10 taken along a line III-III in FIG. 1.

The fuel cell 10 is formed by stacking a plurality of power generation units 12 each including, in effect, two unit cells in a direction indicated by an arrow A. Each of the power generation unit 12 includes a first separator 14, a first membrane electrode assembly (electrolyte electrode assembly) 16a, a second separator 18, a second membrane electrode assembly 16b, and a third separator 20. The power generation unit 12 may include three or more unit cells.

For example, the first separator 14, the second separator 18, and the third separator 20 are steel plates, stainless steel plates, aluminum plates, plated steel sheets, or metal plates subjected to an anti-corrosion treatment. Each of the first separator 14, the second separator 18, and the third separator 20 has a corrugated shape in cross section, by corrugating metal thin plates by pressure forming. Alternatively, instead of the metal separators, carbon separators or the like may be used as the first separator 14, the second separator 18, and the third separator 20.

The surface area of the first membrane electrode assembly 16a is smaller than the surface area of the second membrane electrode assembly 16b. Each of the first and second membrane electrode assemblies 16a, 16b includes an anode 24, a cathode 26 and a solid polymer electrolyte membrane 22 interposed between the anode 24 and the cathode 26. The solid polymer electrolyte membrane 22 is formed by impregnating a thin membrane of perfluorosulfonic acid with water, for example.

The surface area of the anode 24 is smaller than the surface area of the cathode 26. Upper and lower portions of the solid polymer electrolyte membrane 22, the anode 24, and the cathode 26 are cut away at upper and lower edges of both ends in the direction indicated by the arrow B, and the surface areas of the solid polymer electrolyte membrane 22, the anode 24, and the cathode 26 are reduced.

Each of the anode 24 and the cathode 26 has a gas diffusion layer (not shown) such as a carbon paper, and an electrode catalyst layer (not shown) of platinum alloy supported on porous carbon particles. The carbon particles are deposited uniformly on the surface of the gas diffusion layer. The electrode catalyst layer of the anode 24 and the electrode catalyst layer of the cathode 26 are fixed to both surfaces of the solid polymer electrolyte membrane 22, respectively.

At an upper end of the power generation unit 12 in the longitudinal direction indicated by an arrow C, an oxygen-containing gas supply passage 30a for supplying an oxygen-containing gas and a fuel gas supply passage (reactant gas passage) 32a for supplying a hydrogen-containing gas are provided. The oxygen-containing gas supply passage 30a and the fuel gas supply passage 32a extend through the power generation unit 12 in the direction indicated by the arrow A.

At a lower end of the power generation unit 12 in the longitudinal direction indicated by the arrow C, a fuel gas discharge passage (reactant gas passage) 32b for discharging the fuel gas and an oxygen-containing gas discharge passage 30b for discharging the oxygen-containing gas are provided. The fuel gas discharge passage 32b and the oxygen-containing gas discharge passage 30b extend through the power generation unit 12 in the direction indicated by the arrow A.

At one end of the power generation unit 12 in a lateral direction indicated by an arrow B, a coolant supply passage 34a for supplying a coolant is provided, and at the other end of the power generation unit 12 in the lateral direction indicated by the arrow B, a coolant discharge passage 34b for discharging the coolant is provided. The coolant supply passage 34a and the coolant discharge passage 34b extend through the power generation unit 12 in the direction indicated by the arrow A.

Figure 4:
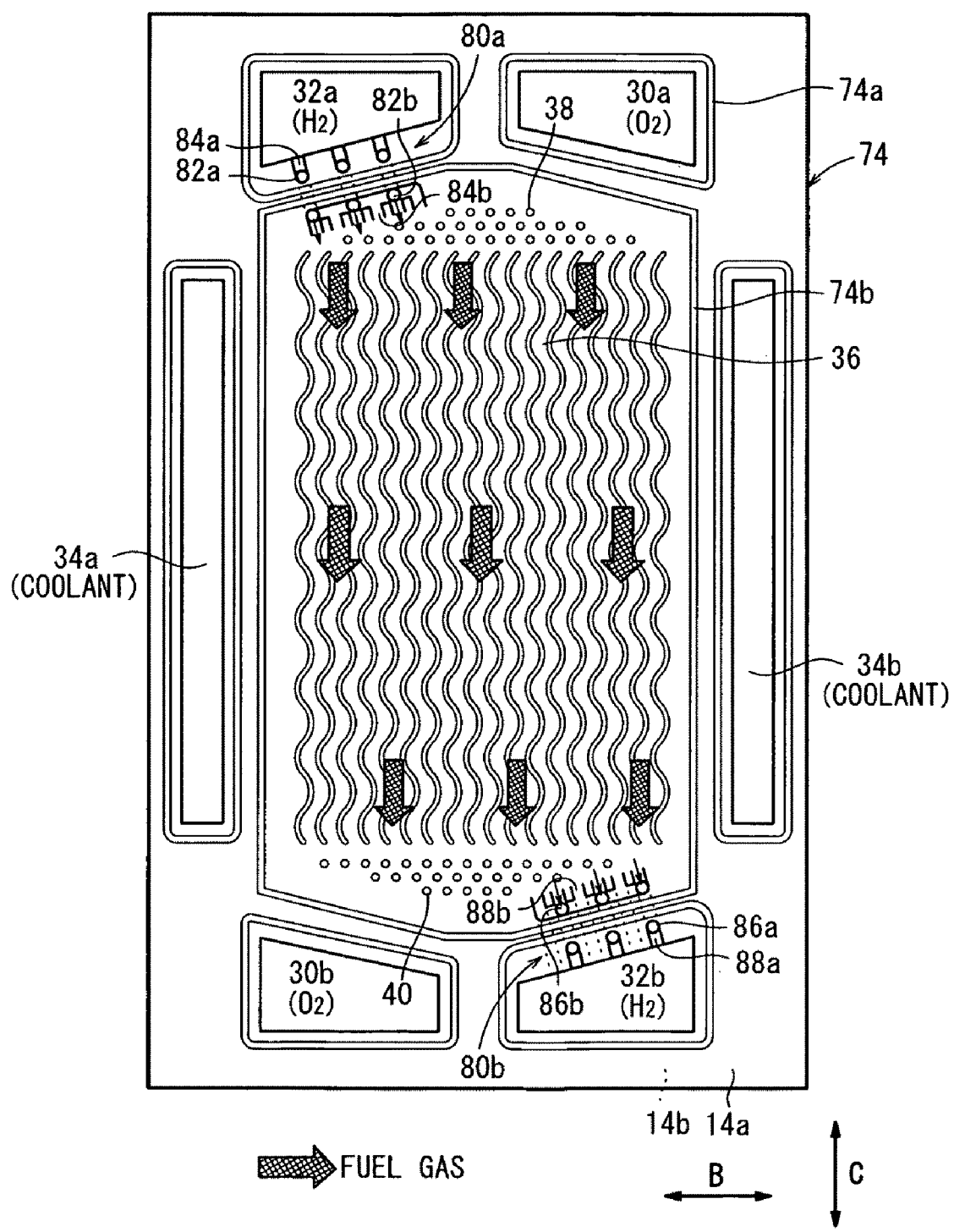
FIG. 4 is a view showing one surface of a first separator of the fuel cell.

As shown in FIG. 4, the first separator 14 has a first fuel gas flow field (first reactant gas flow field) 36 on its surface 14a facing the first membrane electrode assembly 16a. The first fuel gas flow field 36 is connected between the fuel gas supply passage 32a and the fuel gas discharge passage 32b. The first fuel gas flow field 36 includes a plurality of corrugated flow grooves extending in the direction indicated by the arrow C. An inlet buffer 38 and an outlet buffer 40 are provided at positions near an inlet (upper end) and an outlet (lower end) of the first fuel gas flow field 36, and a plurality of bosses are provided in the inlet buffer 38 and the outlet buffer 40.

Figure 5:
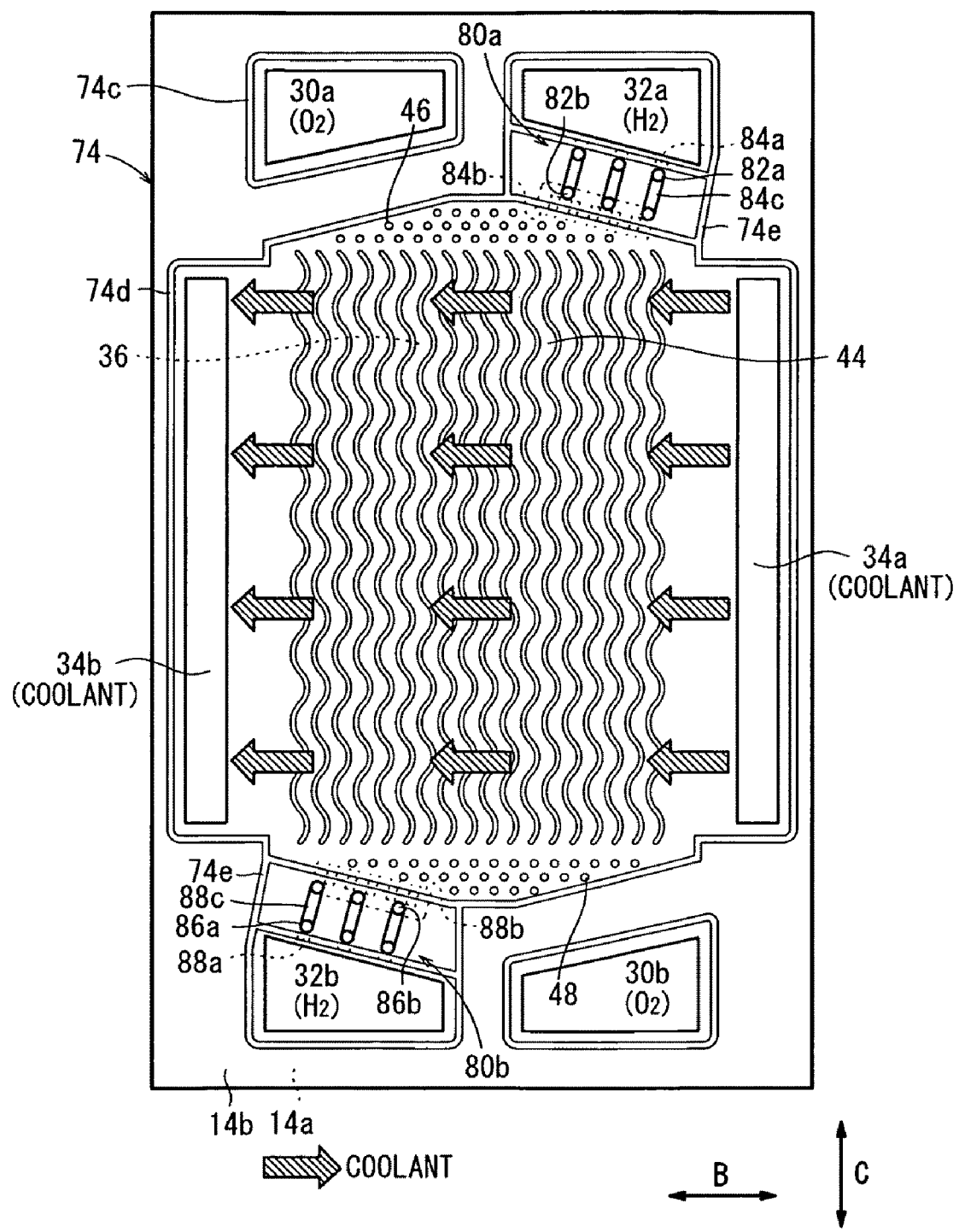
FIG. 5 is a view showing the other surface of the first separator.

As shown in FIG. 5, the first separator 14 has a coolant flow field 44 connected between the coolant supply passage 34a and the coolant discharge passage 34b. Buffers 46, 48 are provided at positions near the upper end and the lower end of the coolant flow field 44 on the back surfaces of the inlet buffer 38 and the outlet buffer 40.

Figure 6:
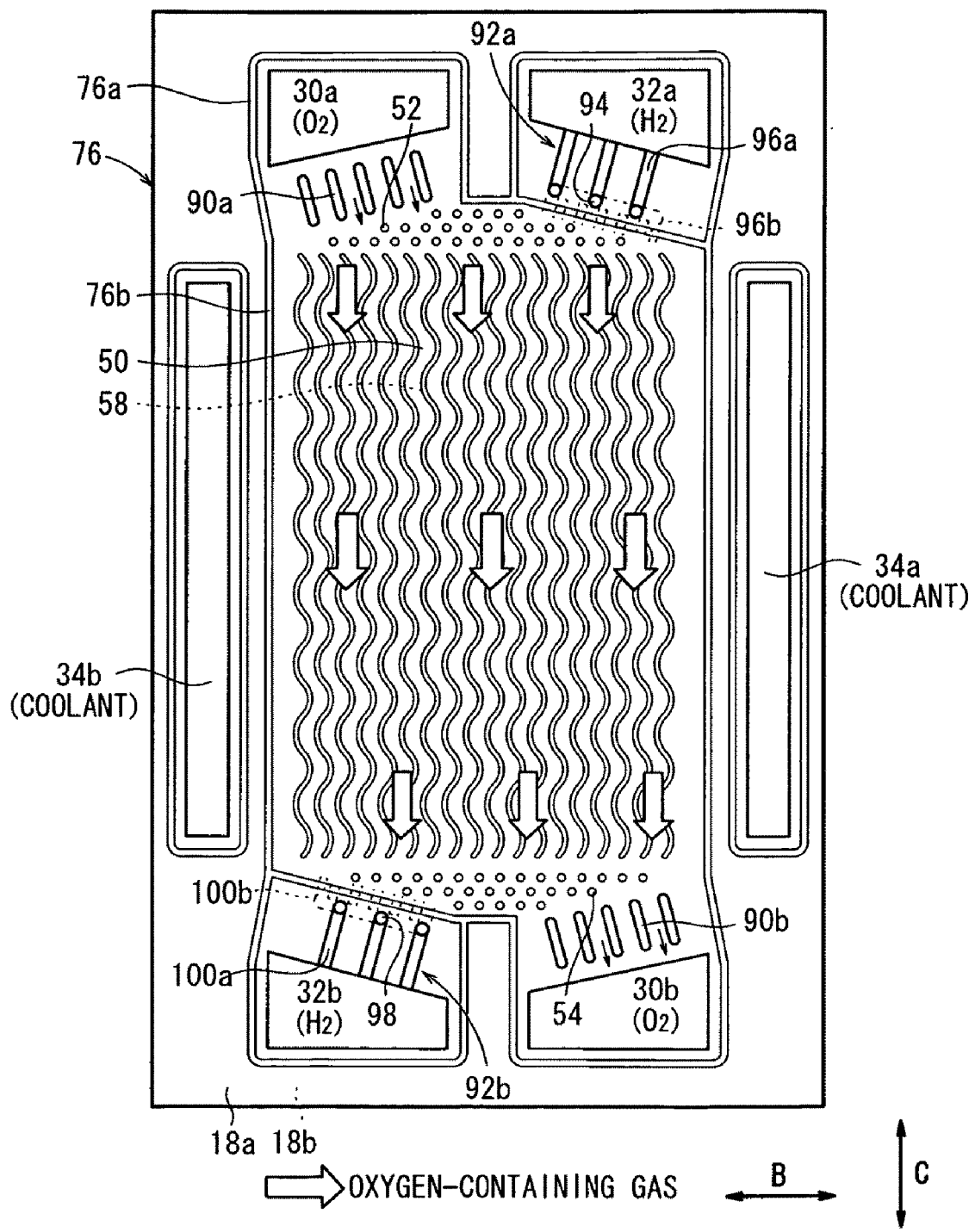
FIG. 6 is a view showing one surface of a second separator of the fuel cell.

As shown in FIG. 6, the second separator 18 has a first oxygen-containing gas flow field 50 on its surface 18a facing the first membrane electrode assembly 16a. The first oxygen-containing gas flow field 50 is connected between the oxygen-containing gas supply passage 30a and the oxygen-containing gas discharge passage 30b. The first oxygen-containing gas flow field 50 includes a plurality of corrugated flow grooves extending in the direction indicated by the arrow C. An inlet buffer 52 and an outlet buffer 54 are provided at positions near an inlet (upper end) and an outlet (lower end) of the first oxygen-containing gas flow field 50.

Figure 7:
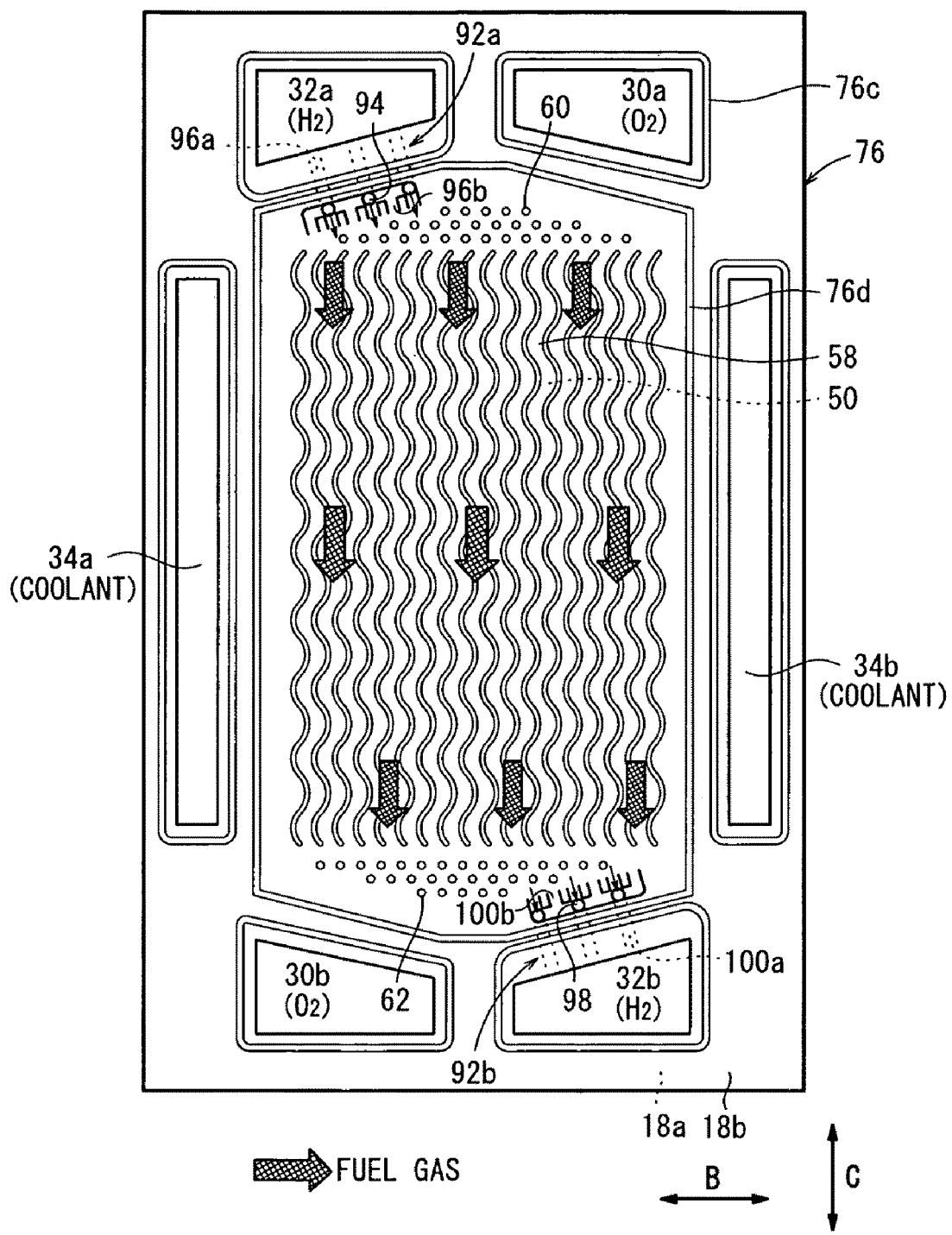
FIG. 7 is a view showing the other surface of the second separator.

As shown in FIG. 7, the second separator 18 has a second fuel gas flow field (second reactant gas flow field) 58 on a surface 18b facing the second membrane electrode assembly 16b. The second fuel gas flow field 58 is connected between the fuel gas supply passage 32a and the fuel gas discharge passage 32b. The second fuel gas flow field 58 includes a plurality of flow grooves extending in the direction indicated by the arrow C. An inlet buffer 60 and an outlet buffer 62 are provided at positions near an inlet (upper end) and an outlet (lower end) of the second fuel gas flow field 58.

Figure 8:
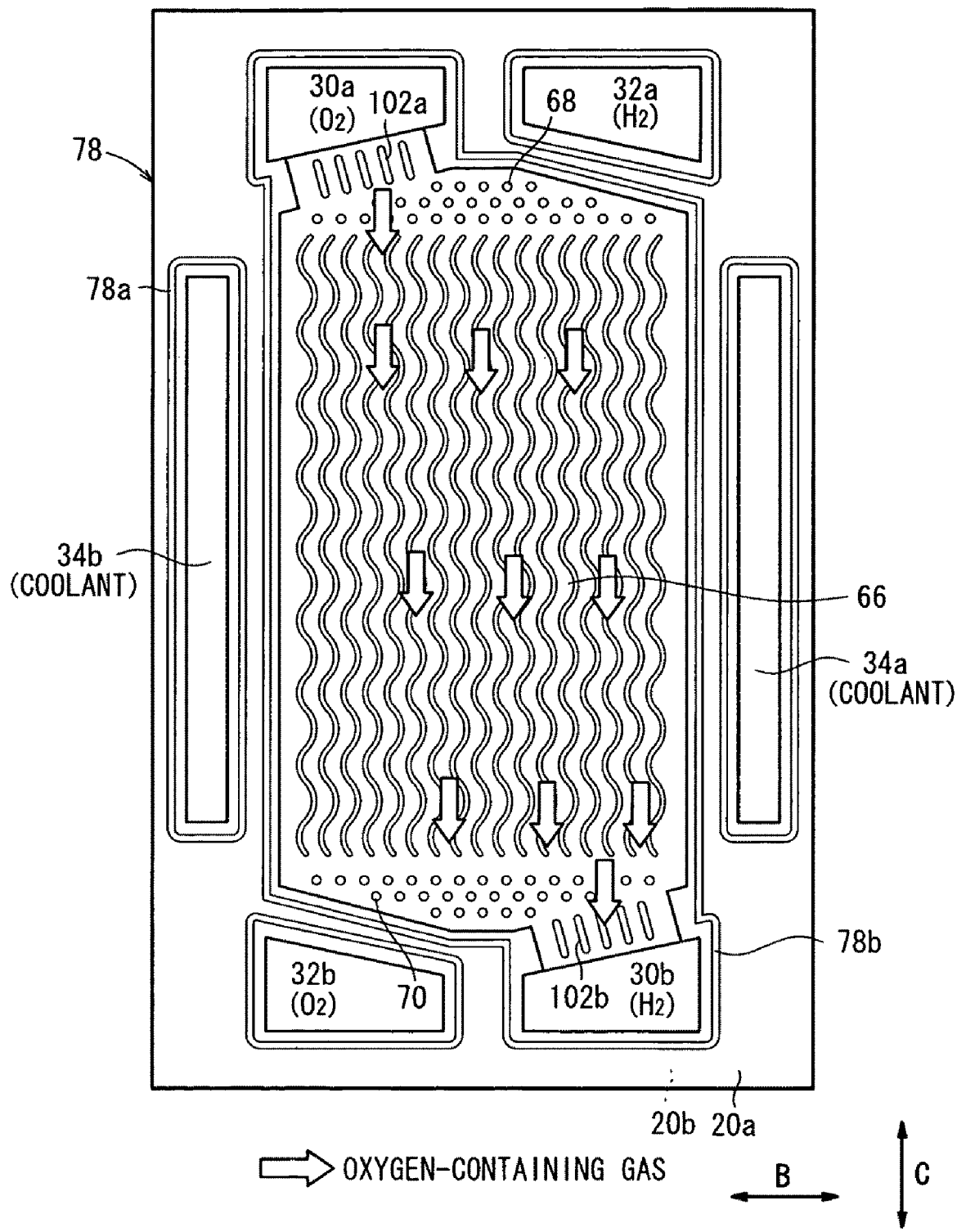
FIG. 8 is a front view showing a third separator of the fuel cell.

As shown in FIG. 8, the third separator 20 has a second oxygen-containing gas flow field 66 on a surface 20a facing the second membrane electrode assembly 16b. The second oxygen-containing gas flow field 66 is connected between the oxygen-containing gas supply passage 30a and the oxygen-containing gas discharge passage 30b.

The second oxygen-containing gas flow field 66 includes a plurality of corrugated flow grooves extending in the direction indicated by the arrow C. An inlet buffer 68 and an outlet buffer 70 are provided at positions near an inlet (upper end) and an outlet (lower end) of the second oxygen-containing gas flow field 66.

As shown in FIG. 1, the coolant flow field 44 connected between the coolant supply passage 34a and the coolant discharge passage 34b is formed on a surface 20b of the third separator 20. The coolant flow field 44 is formed by overlapping corrugated back surfaces of the first fuel gas flow field 36 and the second oxygen-containing gas flow field 66.

A first seal member 74 is formed integrally on the surfaces 14a, 14b of the first separator 14, around the outer end of the first separator 14. A second seal member 76 is formed integrally on the surfaces 18a, 18b of the second separator 18, around the outer end of the second separator 18. A third seal member 78 is formed integrally on the surfaces 20a, 20b of the third separator 20, around the outer end of the third separator 20. Each of the first to third seal members 74, 76, 78 is made of seal material, cushion material, or packing material such as an EPDM (ethylene propylene diene monomer), an NBR (nitrile butadiene rubber), a fluoro rubber, a silicone rubber, a fluorosilicone rubber, a butyl rubber, a natural rubber, a styrene rubber, a chloroprene rubber, or an acrylic rubber.

As shown in FIG. 4, the first seal member 74 includes an outer seal 74a on the surface 14a of the first separator 14, adjacent to the outer end of the first separator 14. Further, the first seal member 74 includes an inner seal 74b spaced inwardly from the outer seal 74a, around the first fuel gas flow field 36.

As shown in FIG. 5, the first seal member 74 includes an outer seal 74c corresponding to the outer seal 74a, and an inner seal 74d corresponding to the inner seal 74b. The outer seal 74c is provided on the surface 14b of the first separator 14, and the inner seal 74d is provided around the coolant flow field 44.

As shown in FIGS. 4 and 5, the first separator 14 has an inlet side first connection channel 80a connecting the fuel gas supply passage 32a and the first fuel gas flow field 36, and an outlet side first connection channel 80b connecting the fuel gas discharge passage 32b and the first fuel gas flow field 36.

The inlet side first connection channel 80a includes a plurality of outer supply holes 82a and a plurality of inner supply holes 82b. The outer supply holes 82a pass through a portion where an area surrounded by the outer seal 74a and an area surrounded by a connection seal 74e between the outer seal 74c and the inner seal 74d are overlapped with each other. The inner supply holes 82b pass through a portion where an area surrounded by the inner seal 74b and an area surrounded by the connection seal 74e are overlapped with each other.

As shown in FIG. 4, three outer passages 84a connecting the fuel gas supply passage 32a and the three outer supply holes 82a and six inner passages 84b connecting the three inner supply holes 82b and the inlet buffer 38 are provided. As shown in FIG. 5, on the surface 14b, three intermediate passages 84c connecting the outer supply holes 82a and the inner supply holes 82b are provided.

Likewise, the outlet side first connection channel 80b includes a plurality of, e.g., three outer discharge holes 86a and a plurality of, e.g., three inner discharge holes 86b. The outer discharge holes 86a pass through a portion where an area surrounded by the outer seal 74a and an area surrounded by the connection seal 74e are overlapped with each other. The inner discharge holes 86b pass through a portion where an area surrounded by the inner seal 74b and an area surrounded by the connection seal 74e are overlapped with each other.

On the surface 14a, three outer passages 88a connecting the fuel gas discharge passage 32b and the respective outer discharge holes 86a, and six inner passages 88b connecting the inner discharge holes 86b and the outlet buffer 40 are formed. As shown in FIG. 5, on the surface 14b, three intermediate passages 88c connecting the outer discharge holes 86a and the inner discharge holes 86b are formed.

As shown in FIG. 6, the second seal member 76 includes an outer seal 76a and an inner seal 76b. The outer seal 76a is provided on the surface 18a of the second separator 18, and the inner seal 76d is provided inside the outer seal 76a around the first oxygen-containing gas flow field 50. The outer seal 76a and the inner seal 76b are provided such that the oxygen-containing gas supply passage 30a and the oxygen-containing gas discharge passage 30b are connected to the first oxygen-containing gas flow field 50. A plurality of receivers 90a, 90b are provided at the connecting portions.

As shown in FIG. 7, the second seal member 76 includes an outer seal 76c and an inner seal 76d. The outer seal 76c is provided on the surface 18b of the second separator 18 near the outer end of the second separator 18. The inner seal 76d is provided around the second fuel gas flow field 58.

As shown in FIGS. 6 and 7, the second separator 18 has an inlet side second connection channel 92a connecting the fuel gas supply passage 32a and the second fuel gas flow field 58, and an outlet side second connection channel 92b connecting the fuel gas discharge passage 32b and the second fuel gas flow field 58.

The inlet side second connection channel 92a includes a plurality of, e.g., three supply holes 94. The supply holes 94 pass through a portion where an area surrounded by the outer seal 76a and an area surrounded by the inner seal 76d are overlapped with each other. On the surface 18a, outer passages 96a connecting the fuel gas supply passage 32a and the supply holes 94 are formed. As shown in FIG. 7, on the surface 18b, six inner passages 96b connecting the supply holes 94 and the inner buffer 60 are formed.

Likewise, the outlet side second connection channel 92b includes a plurality of, e.g., three discharge holes 98. The discharge holes 98 pass through a portion where an area surrounded by the outer seal 76a and an area surrounded by the inner seal 76d are overlapped with each other. On the surface 18a, three outer passages 100a connecting the discharge holes 98 to the fuel gas discharge passage 32b are formed. As shown in FIG. 7, on the surface 18b, six inner passages 100b connecting the respective discharge holes 98 to the outlet buffer 62 are formed.

As shown in FIG. 8, the third seal member 78 includes an outer seal 78a and an inner seal 78b. The outer seal 78a is provided on the surface 20a of the third separator 20 near the outer end of the third separator 20. The inner seal 78b is provided inside the outer seal 78a around the second oxygen-containing gas flow field 66. A plurality of receivers 102a, 102b are provided in the portions connecting the oxygen-containing gas supply passage 30a and the oxygen-containing gas discharge passage 30b to the second oxygen-containing gas flow field 66.

As shown in FIG. 1, the third seal member 78 includes an outer seal 78c and an inner seal 78d. The outer seal 78c is provided on the surface 20b of the third separator 20 near the outer end of the third separator 20. The inner seal 78d is provided around the coolant flow field 44.

Figure 9:
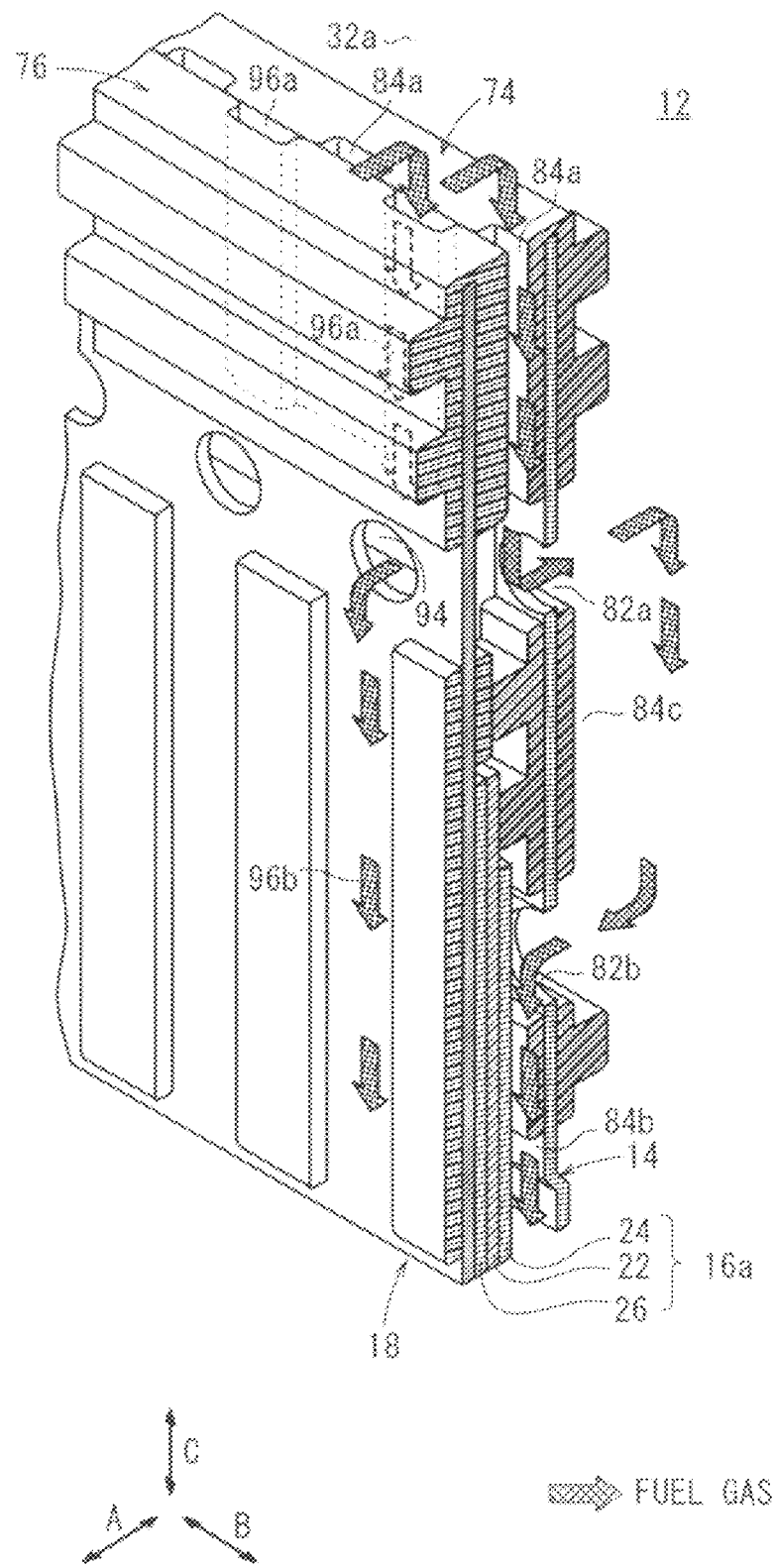
FIG. 9 is a perspective view showing an area near a fuel gas supply passage of the fuel cell.

As shown in FIGS. 4, 6, and 9, when the first separator 14 and the second separator 18 are positioned to face each other, the inlet side first connection channel 80a and the inlet side second connection channel 92a include portions placed in the same separator plane, i.e., the outer passages 84a, 96a. The outer passages 84a and the outer passages 96a are formed independently from one another, i.e., formed alternately in the same plane.

Figure 10:
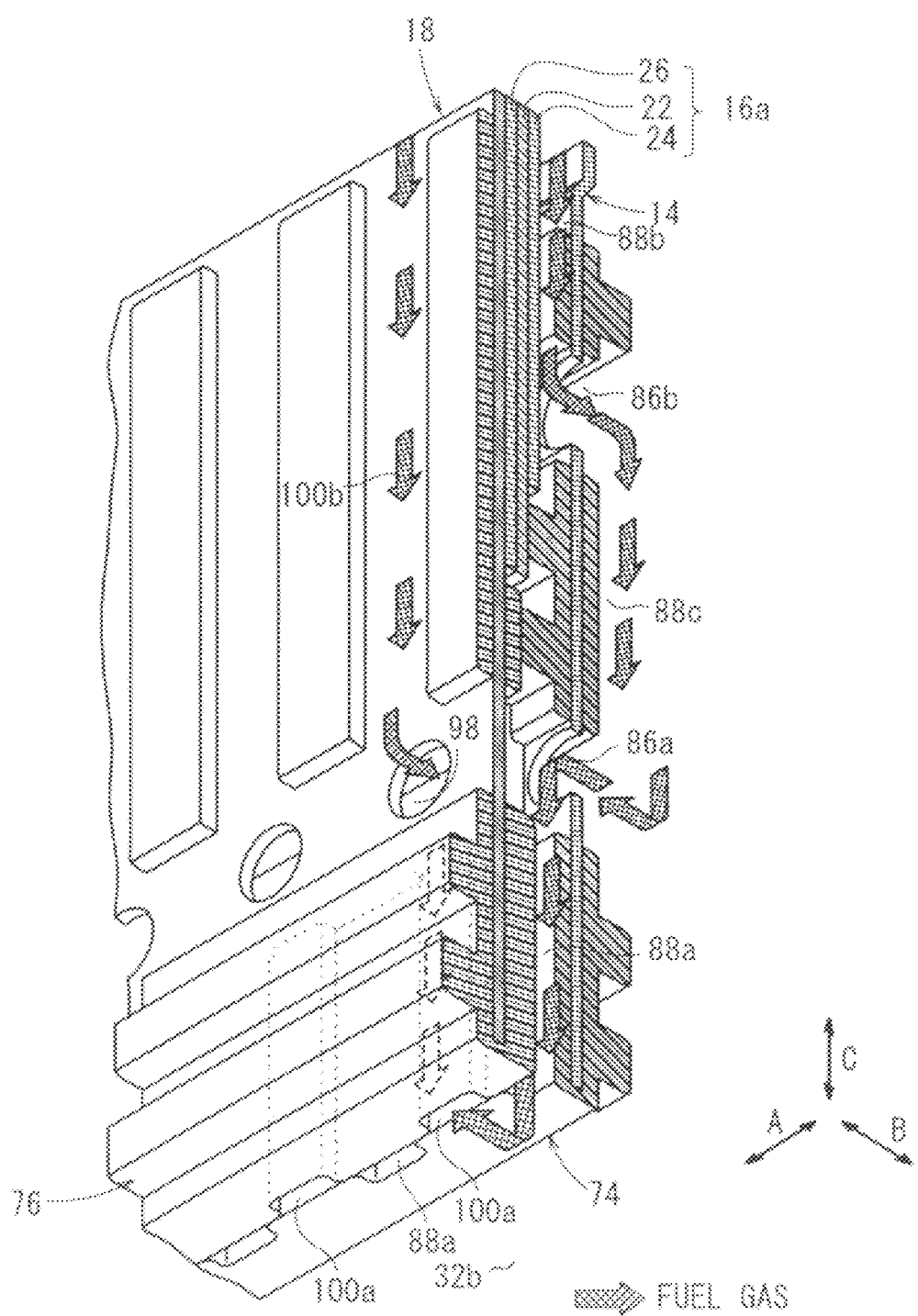
FIG. 10 is a perspective view showing an area near a fuel gas discharge passage of the fuel cell.
Figure 11:
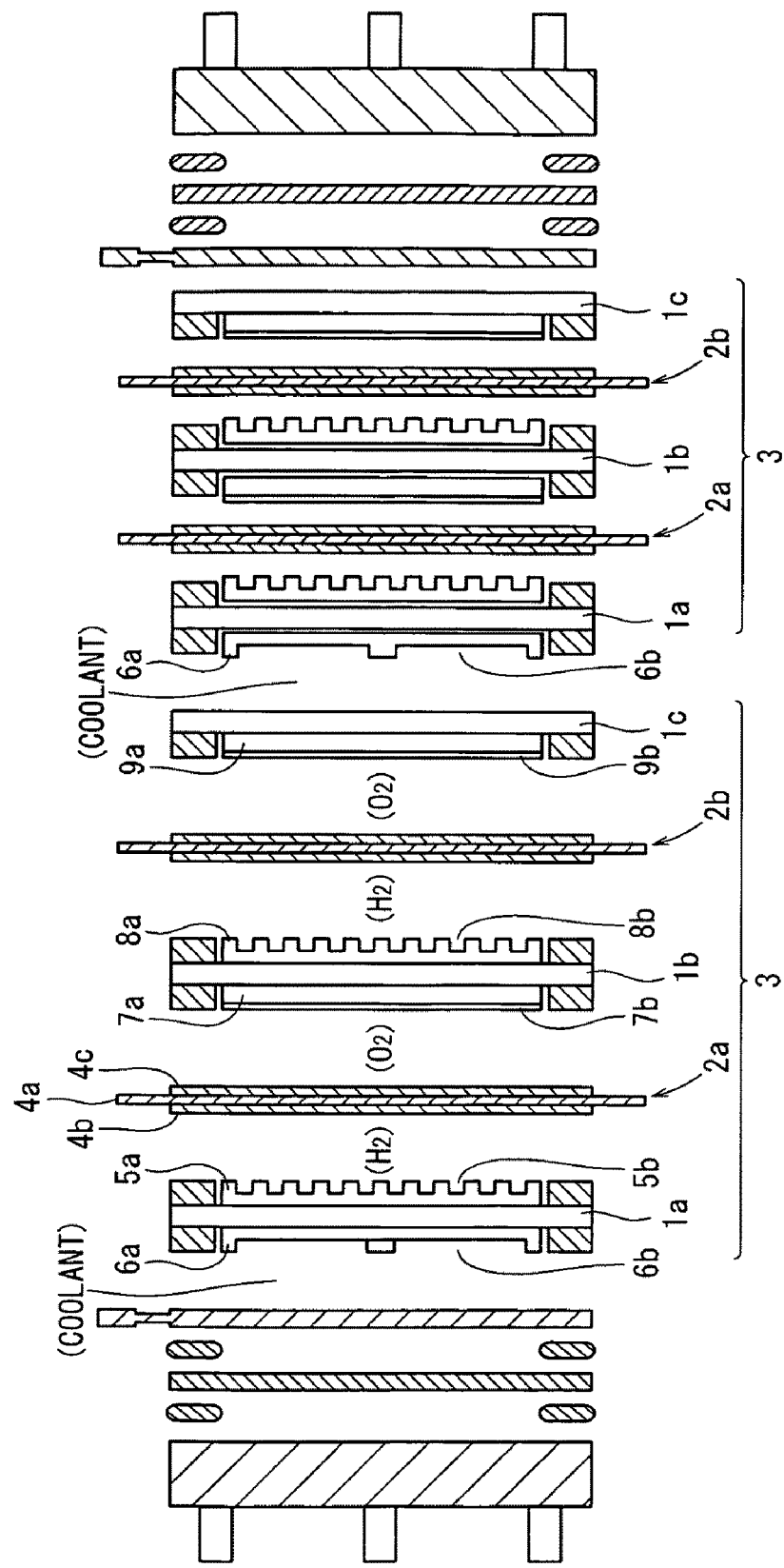
FIG. 11 is an exploded cross sectional view showing a conventional fuel cell.

Likewise, as shown in FIGS. 4, 6, and 10, the outlet side first connection channel 80b and the outlet side second connection channel 92b include the outer passages 88a and the outer passages 100a as portions placed in the same plane. The outer passages 88a and the outer passages 100a are formed independently from one another, i.e., formed alternately in the same separator plane.

Operation of the fuel cell 10 will be described below.

Firstly, as shown in FIG. 1, an oxygen-containing gas is supplied to the oxygen-containing gas supply passage 30a, and a fuel gas such as a hydrogen-containing gas are supplied to the fuel gas supply passage 32a. Further, a coolant such as pure water, ethylene glycol, or oil is supplied to the coolant supply passage 34a.

Therefore, the oxygen-containing gas flows from the oxygen-containing gas supply passage 30a to the first oxygen-containing gas flow field 50 of the second separator 18 and the second oxygen-containing gas flow field 66 of the third separator 20 (FIGS. 6 and 8). The oxygen-containing gas flows in the direction of gravity indicated by the arrow C. The oxygen-containing gas is supplied to the cathode 26 of the first membrane electrode assembly 16a. Further, the oxygen-containing gas flows along the second oxygen-containing gas flow field 66 in the direction indicated by the arrow C, and the oxygen-containing gas is supplied to the cathode 26 of the second membrane electrode assembly 16b (see FIG. 1).

As shown in FIG. 2, the fuel gas flows from the fuel gas supply passage 32a into the outer passages 84a, 96a formed between the first separator 14 and the second separator 18. As shown in FIG. 4, the fuel gas supplied into the outer passages 84a flows through the outer supply holes 82a to the surface 14b of the first separator 14. Further, as shown in FIG. 5, the fuel gas flows through the intermediate passages 84c, and flows into the inner supply holes 82b to the surface 14a.

Thus, as shown in FIG. 4, the fuel gas flows through the inner passages 84b to the inlet buffer 38, and the fuel gas flows along the first fuel gas flow field 36 in the direction of gravity indicated by the arrow C. The fuel gas is supplied to the anode 24 of the first membrane electrode assembly 16a.

Further, as shown in FIG. 6, the fuel gas supplied into the outer passages 96a flows through the supply holes 94 into the surface 18b of the second separator 18. Thus, as shown in FIG. 7, the fuel gas flows through the inner passages 96b on the surface 18b, and then, the fuel gas flows along the second fuel gas flow field 58 in the direction indicated by the arrow C. Thus, the fuel gas is supplied to the anode 24 of the second membrane electrode assembly 16b.

In each of the first and second membrane electrode assemblies 16a, 16b, the oxygen-containing gas supplied to the cathode 26 and the fuel gas supplied to the anode 24 are consumed in the electrochemical reactions at catalyst layers of the cathode 26 and the anode 24 for generating electricity.

Then, the oxygen-containing gas consumed at the cathodes 26 of the first and second membrane electrode assemblies 16a, 16b is discharged to the oxygen-containing gas discharge passage 30b, and flows in the direction indicated by the arrow A.

As shown in FIG. 4, the fuel gas consumed at the anode 24 of the first membrane electrode assembly 16a flows from the outlet buffer 40 to the inner passages 88b, and flows through the inner discharge holes 86b to the surface 14b of the first separator 14.

As shown in FIG. 5, the fuel gas discharged to the side of the surface 14b flows through the outer discharge holes 86a through the intermediate passages 88c, and again, moves toward the surface 14a. Therefore, as shown in FIG. 4, the fuel gas flows from the outer discharge holes 86a to the outer passages 88a. Then, the fuel gas is discharged to the fuel gas discharge passage 32b (see FIG. 10).

As shown in FIG. 7, the fuel gas consumed at the anode 24 of the second membrane electrode assembly 16b flows from the outlet buffer 62 to the inner passages 100b, and flows through the discharge holes 98 to the surface 18a. As show in FIGS. 6 and 10, the fuel gas flows through the outer passages 100a to the fuel gas discharge passage 32b.

As shown in FIG. 1, the coolant supplied to the coolant supply passage 34a flows into the coolant flow field 44 between the first separator 14 and the third separator 20. Then, the coolant flows in the direction indicated by the arrow B. The coolant used for cooling the first and second membrane electrode assemblies 16a, 16b is discharged to the coolant discharge passage 34b.

In the embodiment, as shown in FIGS. 4 and 5, in the first separator 14, the outlet side first connection channel 80b connecting the first fuel gas flow field 36 and the fuel gas discharge passage 32b is provided, and as shown in FIGS. 6 and 7, in the second separator 18, the outlet side second connection channel 92b connecting the second fuel gas flow field 58 and the fuel gas discharge passage 32b is provided.

The outlet side first connection channel 80b and the outlet side second connection channel 92b include the outer passages 88a and the outer passages 100a as the portions placed in the same plane formed by the first and second separators 14, 18. Therefore, the flow field structure is simplified effectively in each of the outlet side first connection channel 80b and the outlet side second connection channel 92b.

Further, as shown in FIG. 10, the outer passages 88a and the outer passages 100a are formed independently from one another, i.e., formed alternately on the same plane. In the structure, the fuel gas discharged from the first fuel gas flow field 36 to the outlet side first connection channel 80b and the fuel gas discharged from the second fuel gas flow field 58 to the outlet side second connection channel 92b are not merged or distributed, and discharged individually into the fuel gas discharge passage 32b.

Thus, the outlet side first connection channel 80b is not affected by the flows of the fuel gas and the water produced in the power generation in the second fuel gas flow field 58, and the outlet side second connection channel 92b is not affected by the flows of the fuel gas and the produced water in the first fuel gas flow field 36. Accordingly, the fuel gas and the produced water discharged from the first fuel gas flow field 36, the second fuel gas flow field 58, electrode catalyst layers, and the outlet buffers 40, 62 are discharged smoothly and reliably into the fuel gas discharge passage 32b.

Further, clogging due to the produced water does not occur in the outlet side first connection channel 80b and the outlet side second connection channel 92b. Thus, degradation of the power generation performance due to the insufficient stoichiometric ratio is prevented suitably. For example, instability in the power generation at the time of low load operation, and increase in the concentration overpotential at the time of high load operation are prevented.

Further, in the embodiment, the first separator 14 includes the inlet side first connection channel 80a connecting the first fuel gas flow field 36 and the fuel gas supply passage 32a, and the second separator 18 includes the inlet side second connection channel 92a connecting the second fuel gas flow field 58 and the fuel gas supply passage 32a.

The inlet side first connection channel 80a and the inlet side second connection channel 92a include the outer passages 84a and the outer passages 96a formed alternately in the same plane formed by the first separator 14 and the second separator 18. In the structure, flow distribution or merging does not occur in the inlet side first connection channel 80a and the inlet side second connection channel 92a on the inlet sides (outer passages 84a, 96a), and the pressure loss is suppressed. In this manner, it becomes possible to smoothly and reliably supply the fuel gas from the fuel gas supply passage 32a to the first fuel gas flow field 36 and the second fuel gas flow field 58. In particular, even if pure hydrogen is used, and the stoichiometric ratio is low, it is possible to supply the fuel gas smoothly and reliably.

While the invention has been particularly shown and described with reference to the preferred embodiment, it will be understood that variations and modifications can be effected thereto by those skilled in the art without departing from the spirit of the invention as defined by the appended claims.

What is claimed is:

1. A fuel cell formed by stacking a plurality of power generation units, the power generation units each comprising first and second electrolyte electrode assemblies, and formed by stacking the first electrolyte electrode assembly on a first separator, a second separator on the first electrolyte electrode assembly, the second electrolyte electrode assembly on the second separator, a third separator on the second electrolyte electrode assembly, the first and second electrolyte electrode assemblies each including a pair of electrodes and an electrolyte interposed between the electrodes, a reactant gas passage for at least a fuel gas or an oxygen-containing gas as one of reactant gases extending through the power generation units, a coolant flow field for a coolant being formed between the power generation units, wherein a first reactant gas flow field for supplying the one of the reactant gases to one of electrode surfaces of the first electrolyte electrode assembly, and a first connection channel connecting the reactant gas passage and the first reactant gas flow field are formed on the first separator;

a second reactant gas flow field for supplying the one of the reactant gases to one of electrode surfaces of the second electrolyte electrode assembly, and a second connection channel for connecting the reactant gas passage and the second reactant gas flow field are formed on the second separator; and at least portions of the first connection channel serving the first reactant gas flow field and the second connection channel serving the second reactant gas flow field are arranged in the same plane formed by mutually facing the first separator and the second separator, and are formed independently from each other at different positions in the same plane.

2. A fuel cell according to claim 1, wherein at least the portions of the first connection channel and the second connection channel arranged in the same separator plane are formed alternately.

3. A fuel cell according to claim 1, wherein the first connection channel includes a plurality of first holes passing through the first separator, and the first holes connect the reactant gas passage and the first reactant gas flow field; and the second connection channel includes a plurality of second holes passing through the second separator, and the second holes connect the reactant gas passage and the second reactant gas flow field.

4. A fuel cell according to claim 3, wherein the first holes are arranged in two rows in a direction intersecting a flow direction of the reactant gas, and second holes are arranged in one row in the direction interesting the flow direction of the reactant gas.

5. A fuel cell according to claim 1, wherein the first and second connection channels respectively connect the first and second reactant gas flow fields to the same reactant gas passage.

* * * * *